Patented July 29, 1952

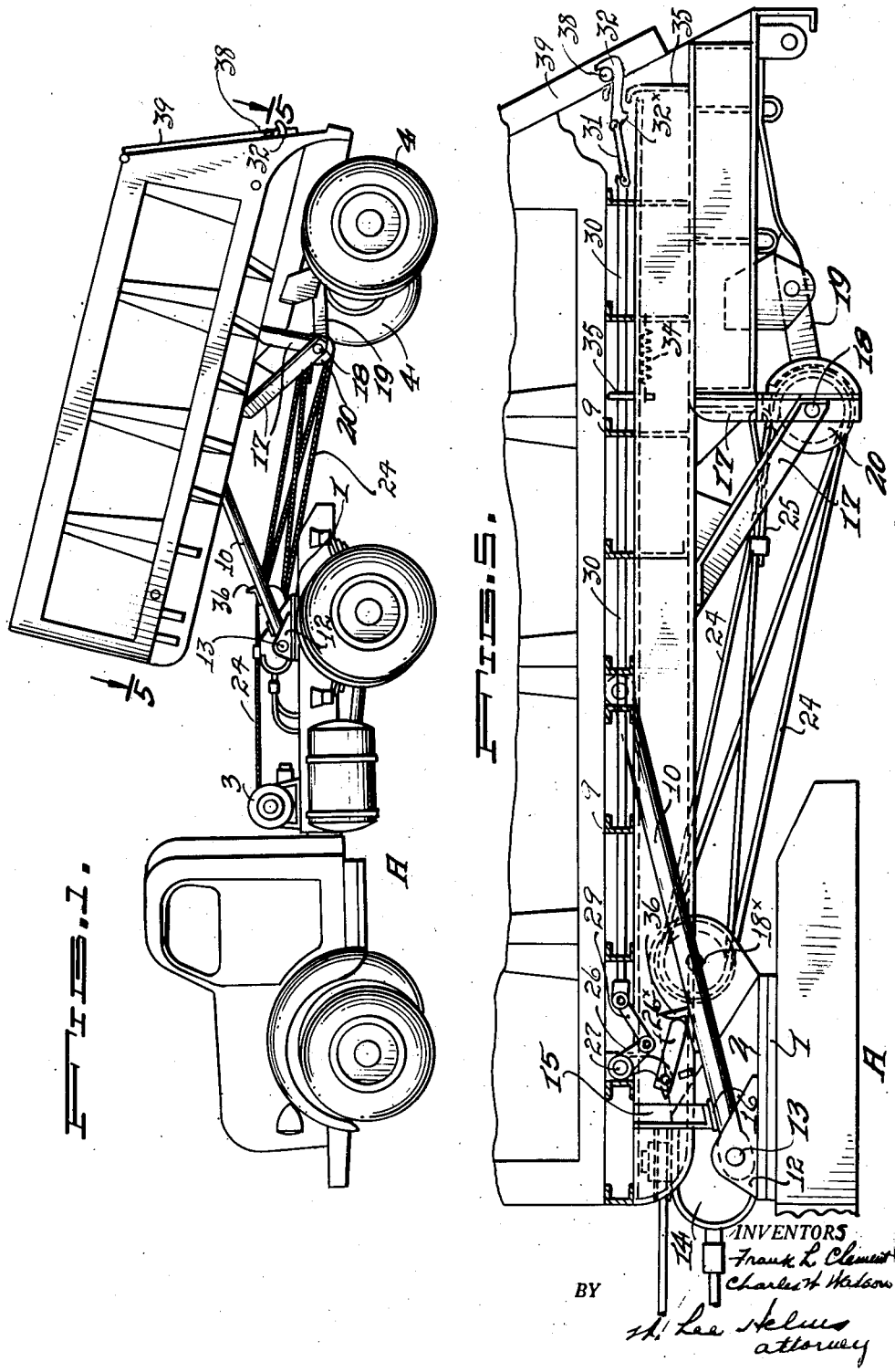

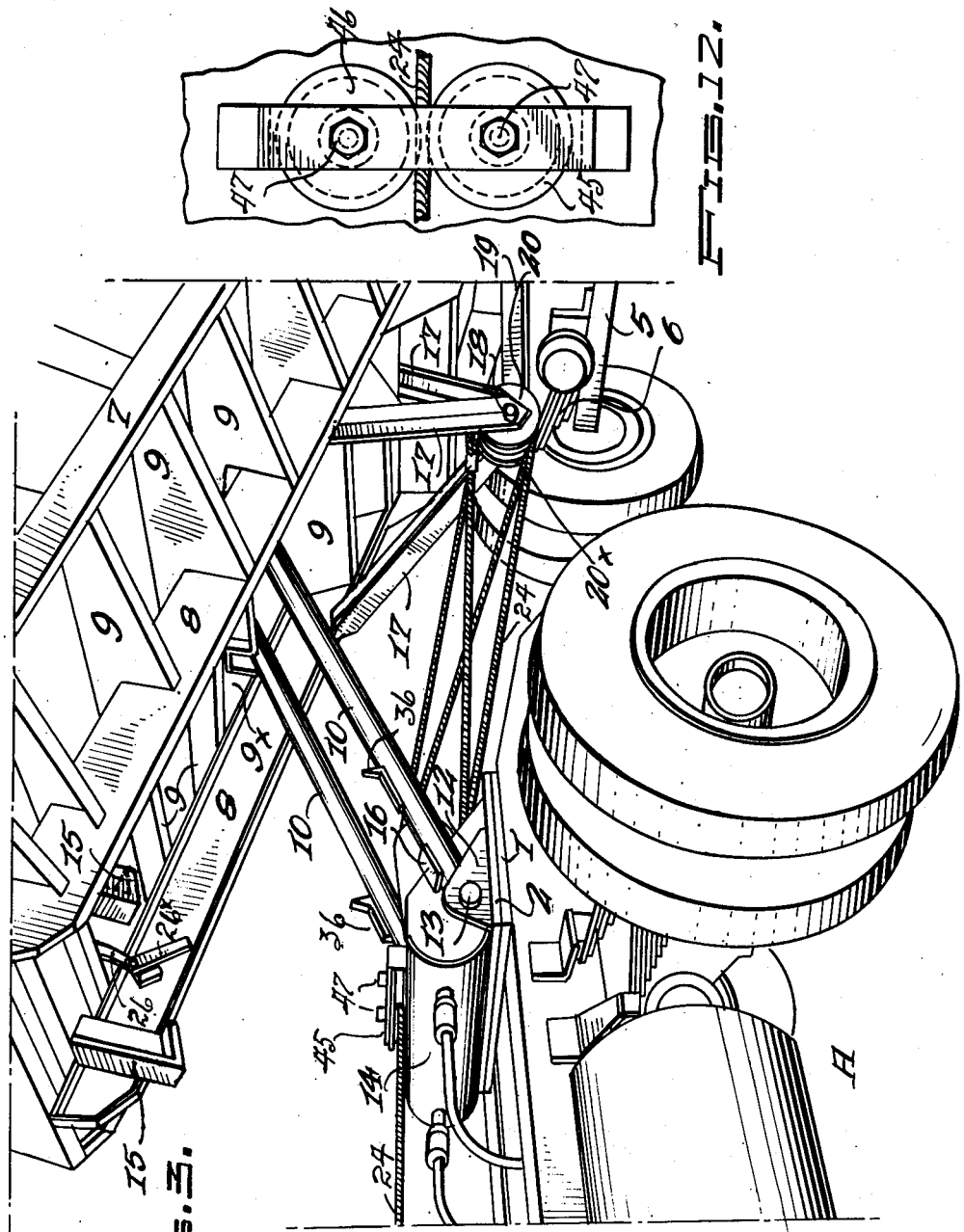

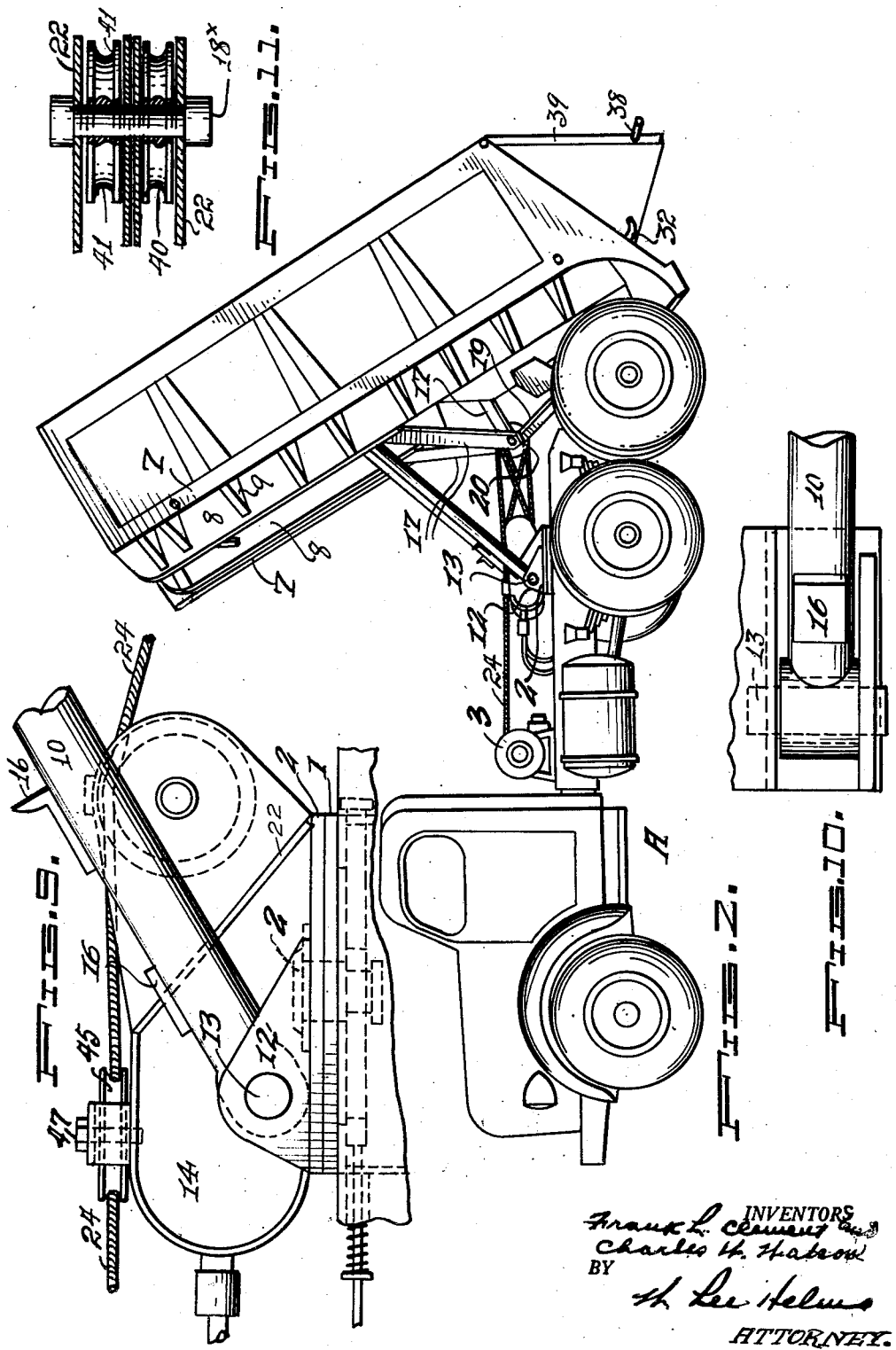

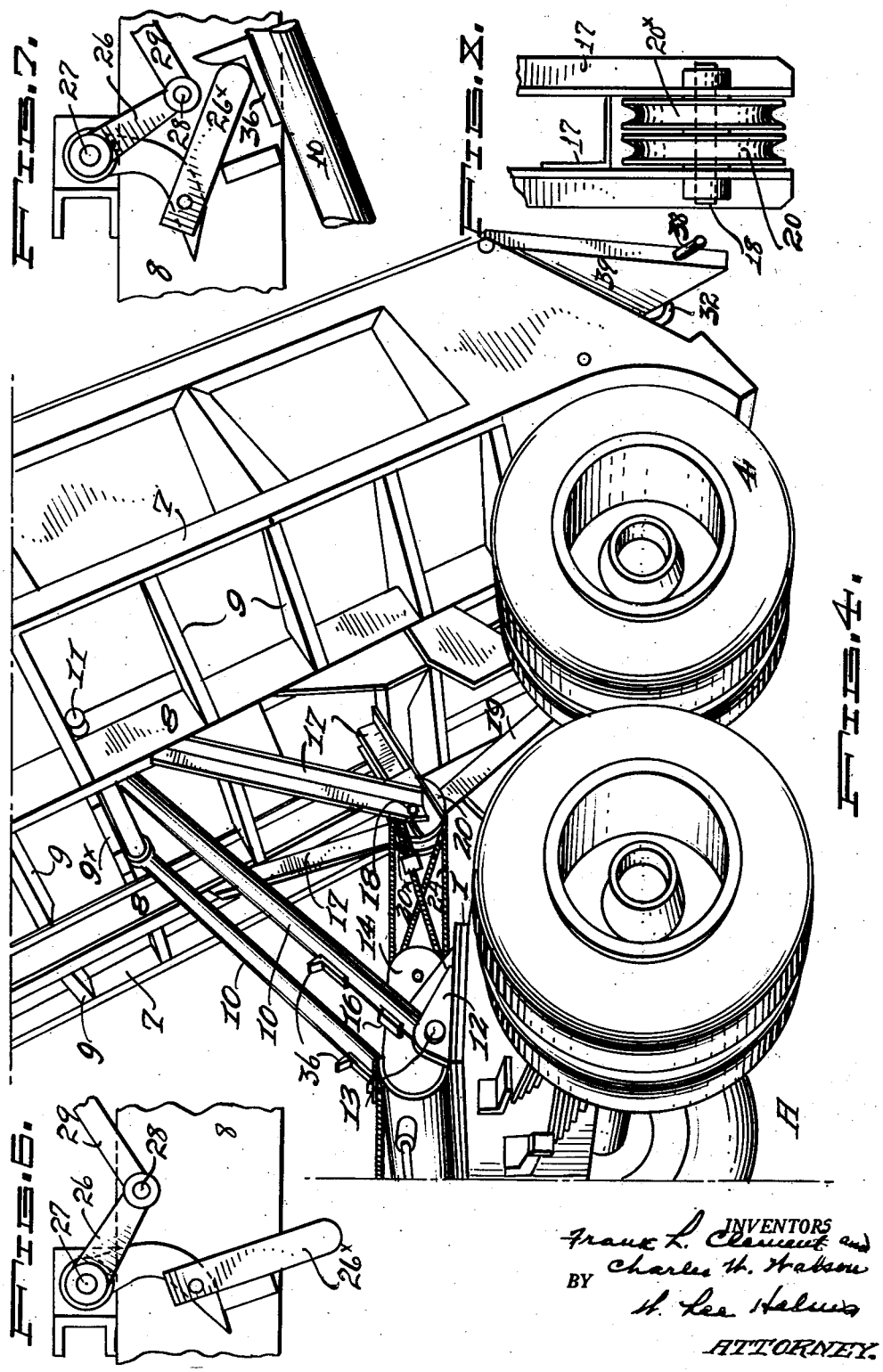

2,605,134

UNITED STATES PATENT OFFICE 2,605,134

DUMPING TRAILER

Frank L. Clement and Charles W. Watson,
Minden, La.

Application June 3, 1948, Serial No. 30,786

1 Claim. (Cl. 298—20)

The present invention relates to a type of dumping trailer in which the body is carried by a rigid frame mounted to pivot on the axle of a pair of wheels at its rear, and normally supported near its front end on a fifth wheel assembly carried at the rear end of a wheeled power driven truck. Means are provided for simultaneously drawing forward and tilting the dumping trailer, its wheels being drawn toward the rear wheels of the truck.

The specific objects of the invention are to improve the operation and strength of the structure whilst minimizing weight. The trailer body is drawn forward for tilting by a special form of cable control leading from a winch on the truck to twin pulleys mounted in an inverted rigid tripod depending from the rugged frame of the trailer. The tilting is effected, in such action, by the rise of two lift bars pivoted to short heavy arms rising from the rotatable top plate of the fifth wheel. These arms at their tops swivel upon a common axle held by the trailer frame and extending transversely thereof as a frame base reinforcing member. The trailer frame at its front rests directly on these arms, the latter having an added leverage function for steadying the trailer in both straightaway runs and in turning via the action of the fifth wheel inasmuch as they lie forwardly of its pivotal centre at opposite sides thereof. Each arm also co-acts through an abutment carried thereby for operating a latching and latch releasing element for the tail gate of the trailer, the elements and each control therefor being independent as a safety factor.

The invention will be described with reference to the accompanying drawings, in which—

Fig. 1 is a view in elevation showing an embodiment of the invention with the trailer partly raised;

Fig. 2 is a view in elevation showing an embodiment in full dumping position;

Fig. 3 is a fragmentary perspective view looking toward the under portion of the body, the latter being partly raised;

Fig. 4 is a view similar to the preceding figure, showing the body in full dumping position;

Fig. 5 is a more enlarged fragmentary side elevation, partly broken away in order to show more clearly the relation of the left-arms to the tail gate release and to the front support of the trailer body, the latter being in down position;

Fig. 6 is a detail elevation showing certain tail gate operating lever elements, at the front of the trailer body, in released position;

Fig. 7 is a view similar to Fig. 6 showing the said operating lever elements in closed and operating position;

Fig. 8 is a fragmentary plan view showing the trailer body pull sheaves as carried by the depending tripod;

Fig. 9 is a fragmentary view in elevation showing, in full and dotted lines, the fifth wheel and one lift bar mounting, also the cable guide roller mounting;

Fig. 10 is a detail plan view showing a lift bar pivot and mounting; and

Fig. 11 is a detail plan view showing the vertical cable guide rollers and their mounting.

Fig. 12 is a fragmentary plan view showing the horizontal cable guiding rollers.

Referring to the drawings, I have shown at A a power driven truck which may be of any suitable general construction. Toward the rear portion of the truck frame is mounted the base plate 1 (Fig. 9) of a fifth wheel or turntable having a rotatable top plate 2 pivoted on a pivot stud (not shown). Plate 2 provides pivot mounting points for two lift bars as later to be described. On the truck frame is a power driven winch 3.

The trailer consists of a body-carrying frame mounted on the wheels 4 through the intermediaries of axle 5 and springs 6. The frame of the trailer consists of longitudinally extending outer frame members 7 and central longitudinal frame members 8, these frame members being complemented by transverse frame struts 9. One of the transverse struts, indicated at 9x, is formed with incuts or recesses for clearance of two lift bars 10. These bars have upper ends pivoted upon a pivot shaft 11 held by the frame. Each bar at its lower end is pivoted upon a rigid arm 12 rising from rotating plate 2 of the fifth wheel assembly, a suitable pivot stud being indicated at 13 for one of the arms. The upstanding arms 12 may be used as end abutments for a tank, as for compressed air, indicated at 14, the tank resting upon the fifth wheel plate 2.

Carried at the inner face of each of the two intermediate longitudinal frame members 8 is a shoe 15, Figs. 3 and 5, and each shoe is adapted to rest upon a seat 16 by which the load thrust is thrown upon the lift arms 10 and the latter are cantilevers. These seat-plates are located close to the pivotal points for the lifting bars, at the fifth wheel assembly.

Toward the rear of the trailer frame the latter rigidly carries a depending tripod frame consisting of the angle bars 17, these bars supporting a short pivot stud 18, Fig. 5. A rearwardly extending steady bar may be provided as indicated at 19, Fig. 5. Shaft 18 has mounted thereon two pulleys 20 and 20x. A cable leads from drum 3 to pulley 20 of the tripod frame, the cable thence extending forwardly to a pulley 40 on shaft 18x, the latter being supported on bracket arms 22 supported by rotatable plate 2 of the fifth wheel construction. It will be noted that after leaving drum 3 the cable is guided between two horizontal guide pulleys 45 and 46 mounted on vertical studs 47 carried by top plate of tank 14. The said cable, shown at 24, then extends to the pulley 20x on said shaft 18 (Fig. 8), thence back to pulley 41 on shaft 18x and thence extends rearwardly to a tie loop 25 secured to the frame, as, for example, the tripod frame element 17.

Mounted for action adjacent each of the intermediate longitudinal frame members 8, adjacent the inner face thereof, is a lever arrangement, as shown more particularly in Figs. 6 and 7. This lever arrangement, in each case, consists of a bell-crank 26 pivoted at 27 one arm of the bell-crank being pivotally connected at 28 to a link 29, in turn pivoted to a rod 30 (Fig. 5). The bell-crank has pivoted thereto a bar 26x. The rod extends longitudinally of the trailer frame to its rear end area. At the latter area, rod 30 is pivotally connected to a link 31, which, in turn, is pivoted to a hook 32 of special form, inasmuch as its ends are reversely hooked.

Rod 30 is engaged by spring 34, one end of which engages a depending member 35 fixed to the rod and the other end of which is connected to one of the cross frame members 9. Each hook member 32 is guided by the somewhat wider spaced walls of apertures formed in a cross frame member 35 at the rear of the trailer. When the body is down, rod 30 will be moved forwardly, bell crank 26 being moved from the position of Fig. 6 to the position shown in Figs. 5 and 7, due to the fact that link 31 lies in inclined position. This action will rock the hook upwardly and draw it inwardly to locking position as shown in Fig. 5. When the trailer body is moved downwardly to the position of Fig. 5, such locking action is caused by engagement of bar 26x on each bell crank 26 with the appropriate one of two abutments 36, each abutment being carried by one of the left arms 10.

When the trailer body is raised by the drum and cable assembly, arms 26x will be carried above their abutments 36 and spring 34 will move rod 30 rearwardly. This will cause inclined link 31, as to each hook 32, to move the hook rearwardly and at the same time rock its outer end downwardly and the weight of the hook at its outer end will aid the rocking thereof to such position that it will be free from the latching stud 38 on the tail gate 39, the latter being pivoted at its top.

In the operation of the device the trailer will normally lie in the position of Fig. 5 with its front area supported at four primary points of support, that is to say, the front and rear pivotal points of the lift bars 10, the load thrust being imposed upon the fifth wheel construction through the vertical arms 12 and the lift arm pivots 13. The lift arms 10 are, in effect, cantilever supports for the trailer forwardly thereof, and serve as lateral stabilizers and pull and thrust members centrally thereof. Thus the body is supported in a unique manner which increases the stability of the structure. Also the lift arms have direct co-action with the locking means for the tail gate. It is to be further noted that the tripod frame support for the pulleys carried by the trailer frame are entirely independent of the rear wheel axle. The invention provides a lighter, stronger, and more economical dumping trailer than with constructions of the general type heretofore proposed.

Having described our invention, what we claim and desire to secure by Letters Patent, is as follows:

A dump truck comprising a body supporting frame, forward and rear wheel assemblies normally supporting the body frame in carrying position, the frame being mounted on the rear wheel assembly for upward and rearward tilting movement to dumping position, a draft connection between the forward wheel assembly and the body carrying frame, and means to shorten the wheel base of the body carrying frame, said draft connection comprising a fifth wheel assembly having a rotatable member and carried by the forward wheel assembly, a plurality of lift bars pivotally connected to the body carrying frame and to the rotatable member of the fifth wheel assembly, means for supporting said body carrying frame directly upon said lift bars intermediate their pivotal points whereby said lift bars are operative as cantilever supports for the body carrying frame, a body supported on said body carrying frame; a tail gate mounted at the end of the body, automatic means for latching and unlatching said tail gate upon tilting and reverse movements of the body carrying frame, said automatic means comprising an abutment on one of said lift bars, a bell crank lever pivoted to the body carrying frame and having a member adapted to engage said abutment when the body carrying frame is moved to normal carrying position after a tilting movement thereof for dumping, a latching stud carried by the tail gate, a hook member supported for rectilinear and swinging movement, a pull and push rod operatively connecting the bell crank lever and the hook member, and spring means for rearwardly moving said rod when the bell crank member is raised out of engagement with the lift arm abutment.

FRANK L. CLEMENT.
CHARLES W. WATSON.

REFERENCES CITED

The following references are of record in the file of this patent:

UNITED STATES PATENTS

| Number | Name | Date |
|---|---|---|
| 1,157,749 | Young | Oct. 26, 1915 |
| 1,707,345 | Brown | Apr. 2, 1929 |
| 2,009,466 | Yeager | July 30, 1935 |
| 2,023,330 | Linn | Dec. 3, 1935 |
| 2,213,385 | Dailey | Sept. 3, 1940 |
| 2,237,838 | McClish | Apr. 8, 1941 |
| 2,299,372 | Barrett | Oct. 20, 1942 |
| 2,309,787 | Quintin et al. | Feb. 2, 1943 |
| 2,332,326 | Lex | Oct. 19, 1943 |
| 2,542,795 | Clement et al. | Feb. 20, 1951 |